United States Patent [19]

Knipp et al.

[11] Patent Number: 5,248,735
[45] Date of Patent: Sep. 28, 1993

[54] PROCESS FOR THE VULCANIZATION OF LATEX WITH AROMATIC DITHIOCARBOXYLIC ACIDS

[75] Inventors: Herbert Knipp, Haltern; Gerhard Horpel, Nottuln, both of Fed. Rep. of Germany

[73] Assignee: Huels Aktiengesellschaft, Marl, Fed. Rep. of Germany

[21] Appl. No.: 696,653

[22] Filed: May 7, 1991

[30] Foreign Application Priority Data

May 8, 1990 [DE] Fed. Rep. of Germany ....... 4014627

[51] Int. Cl.$^5$ ............................................ C08C 19/20
[52] U.S. Cl. ..................................... 525/343; 525/351
[58] Field of Search ................................ 525/343, 351

[56] References Cited

FOREIGN PATENT DOCUMENTS 7151 3/1967 Japan.
519998 4/1940 United Kingdom.

Primary Examiner—Christopher Henderson
Attorney, Agent, or Firm—Millen, White, Zelano & Branigan

[57] ABSTRACT

Aromatic hydroxydithiocarboxylic acid vulcanization accelerators for aqueous dispersions of unsaturated polymers are provided which eliminate the formation of health-threatening nitrosamines and do not adversely affect the vulcanization properties.

7 Claims, No Drawings

PROCESS FOR THE VULCANIZATION OF LATEX WITH AROMATIC DITHIOCARBOXYLIC ACIDS

CROSS-REFERENCE TO RELATED APPLICATIONS

The subject matter of this application is related to copending application Ser. No. 07/624,176, entitled "Aromatic Dithiocarboxylic Acid Vulcanization Accelerators and Method for Their Use", allowed application Ser. No. 07/624,009, entitled "Polysulfide Derivatives, Process for the Production and Use for Crosslinking Natural and Synthetic Rubber", both filed on Dec. 7, 1990.

BACKGROUND OF THE INVENTION

The invention relates to a process for the sulfur vulcanization of aqueous dispersions of unsaturated polymers and in particular to the use of dithiocarboxylic acids or their salts as vulcanization accelerators. Optionally, the vulcanization is performed in the presence of other conventional additives. The process according to the invention makes possible the production of acceptable vulcanizates, with the avoidance of nitrosamines, which are considered health risks according to present knowledge.

Both the new hazardous materials decree and the new TRGS 522 "Nitrosamines" (Technical Rules for Hazardous Materials) confront producers and processors in the rubber industry with the task of reducing nitrosamine concentrations. There is agreement that this is to be achieved only with the avoidance of potential nitrosamine sources. But potential nitrosamine sources are the most important vulcanization accelerators in use. (See Kautschuk und Gummi—Kunststoffe 42, 1/89, page 16 ff.).

The vulcanization of latex items, such as, e.g., mattresses, rubberized hair curlers, shoe components or carpet undercoatings, takes place because of the presence of water mainly at temperatures less than or equal to 100° C. To achieve a sufficient crosslinking density and a high vulcanization rate, the vulcanization is performed with accelerator combinations which almost always contain dialkylzinc dithiocarbamates. In the course of the vulcanization process, these disintegrate into amines, which react with the omnipresent $(NO)_x$ to nitrosamines. These nitrosamines, which are considered health risks according to present knowledge (cf. Umschau 1985 (1), 24), can be detected in the ambient air of the production units.

Nitrogen-free vulcanization accelerators are known, e.g., in the form of xanthates and dithiophosphates. However, they are not effective at low vulcanization temperatures and, therefore, are not used. It is known to vulcanize solid rubber with aromatic hydroxydithiocarboxylic acids or their salts. But in this case, the vulcanization takes place at temperatures greater than or equal to 100° C., preferably between 120° and 240° C. (See German Patent Appln. P 39 41 001.3).

SUMMARY OF THE INVENTION

Thus, an object of this invention is to provide a process for the vulcanization of aqueous polymer dispersions which eliminates the development of health-threatening nitrosamines and at the same time does not adversely affect the vulcanization rate at about 100° C., preferably below 100° C., and does not adversely affect the vulcanization properties.

It is an object of the present invention to provide a process for vulcanization of an aqueous dispersion of unsaturated polymers with a vulcanizing system comprising sulfur and an aromatic hydroxydithiocarboxylic acid or its salt of the general formula B-A, wherein B and A are as defined below.

Another object of the present invention is to provide a vulcanized product derived from unsaturated polymers and a vulcanizing system which does not generate carcinogenic nitrosamines.

To achieve these objects, there is added to a vulcanizing system for vulcanization of aqueous dispersions of unsaturated polymers, a vulcanization accelerating amount of an aromatic hydroxydithiocarboxylic acid or its salt of the general formula B—A in which B is

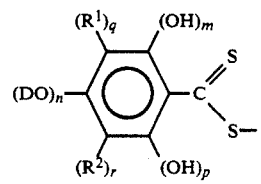

n, m, p, q and r are 0 or 1 with the restriction that the sum of n + m+ [ is at least 1.

$R^1$ and $R^2$ are the same or different radicals which are
  alkyl radicals with 1 to 10 C atoms
  alkylene radicals with 1 to 10 C atoms
  aralkyl radicals with up to 15 C atoms.

D has the meaning of hydrogen or ammonium or univalent or divalent metal ions, preferably Na, K or Zn.

A has the meaning of B or hydrogen or ammonium or a univalent or divalent metal ion, preferably Na, K or Zn. Preferably they are used in an amount of from 0.1 to 5 phr.

Other objects will be apparent from this disclosure and the claims which follow.

Where A represents B, the resultant compound is a "bis" compound where the bond between the two moieties is a

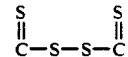

bond. Such compounds are obtained by the oxidation of the dithiocarboxylic acid sodium salt with agents such as $I_2$, hydrochloride or sodium nitride. Conversely, when A is a divalent metal, two B moieties can be bonded by the metal ion, e.g.,

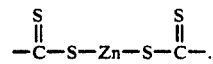

Suitable moieties for $R^1$ and $R^2$ include methyl, ethyl, propyl, isopropyl, pentyl, isopentyl, hexyl, isohexyl, heptyl, octyl, isoctyl, where the iso from represents species with secondary and tertiary carbon atoms, respectively, and methyl, phenyl, ethylphenyl, ethylcyclohexyl, methylcyclohexyl and derivatives thereof having one or more unsaturated carbon pairs. A particularly preferred group requires that $R^1$ and $R^2$ represent tert-butyl. Another preferred group requires the presence of a 4-hydroxy group or salt thereof.

The aromatic hydroxydithiocarboxylic acid or its salt should influence the stability of the polymer dispersions and their gelling properties as little as possible. This can be accomplished where the vulcanization accelerators have a low water solubility. Preferably, the water solubility of the aromatic hydroxydithiocarboxylic acid or its salt is less than 1%, more preferably less than 0.1%.

The dithiocarboxylic acids and salts thereof according to the invention are prepared by dithiocarboxylation of the corresponding phenols to dimethylformamide or to alcohols. A suitable dithiocarboxylation agent is a mixture of carbon disulfide and potassium hydroxide, also potassium dithiocarbonate or potassium trithiocarbonate (see Scheithauer, R. Mayer, in A. Senning: Topics in Sulfur Chemistry, Thio- and Dithiocarboxylic Acids and their Derivatives, Vol. 4, Georg Thieme Verlag, Stuttgart, 1979).

Sulfur vulcanizable natural and synthetic latices are suitable for the application. In the meaning according to the invention, synthetic latices are aqueous dispersions of unsaturated polymers, such as, e.g., butadiene-styrene copolymers with and without a reinforcing part (polystyrene or SB copolymers containing high styrene), polybutadiene, polyisoprene or acrylonitrile-butadiene copolymers (see Blackley, D. C.: high polymer latices, Vol. 1). Preferably, the solids concentration is greater than 60%.

The production and processing of the vulcanizing agent dispersion can be performed by conventional techniques. No special requirements exist relative to the additives and the processing auxiliary agents, such as accelerators, activators, antiozone and antiaging (oxidation) agents, gelling and thickening agents.

The vulcanization can take place in directly heated pressureless molds or in continuous units with steam, hot air or high-frequency energy at temperatures less than or equal to 100° C. In the production of latex items, such as, e.g., rubberized hair curlers or carpets with foam latex coatings, in which drying takes place at the same time with the vulcanization, these items can be heated after drying to higher temperatures.

Preferably, the aromatic hydroxydithiocarboxylic acid or its salt is used in an amount of from 0.1 to 5.0 phr.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth in degrees Celsius and unless otherwise indicated, all parts and percentages are by weight.

The entire disclosures of all applications, patents and publications, cited above and below, and of corresponding application Federal Republic of Germany P 40 14 627.8, filed May 8, 1990, are hereby incorporated by reference.

EXPERIMENTAL

The technical advance, which can be achieved with the substances used according to the invention, is shown by the example of the zinc salt of 3,5-di-t-butyl-4-hydroxybenzene-dithiocarboxylic acid (DBCA Zn) in the production of a foam latex molding and its properties from the basic formulations described below. The water solubility of this zinc salt is less than 10 mg/l. The use of the conventional accelerator, diethylzinc dithiocarbamate, with the basic formulation (DEZC) is shown as a comparison. In the case of DEZC, the amount added corresponds to the amount commonly used in practice. Adding a higher amount is necessary to achieve the same vulcanization rate with DBCA Zn. Foam with good physical properties is obtained without nitrosamines sources.

PRODUCTION OF THE MOLDINGS

The production of latex foam takes place in an aluminum mold (30×30×3 cm$^3$) according to the Dunlop Process (see Reinhard, H.: Dispersionen synthetischer Hochpolymerer [Dispersions of synthetic high polymers], chap. 15). The basic latex formulation and their processing are as described in the product information of BUNATEX SL 3510, 4447/08.87. In examples 1 and 2, the vulcanization time in the expanded steam (approximately 100° C.) is 30 minutes, which is typical for a 30 mm planar sheet. The moldings are washed with water in a centrifuge and dried in hot air for 16 hours at 105° C. In examples 3 and 4, the vulcanization agent dispersion is not added until after the foaming to avoid a reaction between zinc oxide and the ammonia of the natural latex and thus a possible coagulation of the latex. In Examples 1 and 2, the gelling of the foam takes place while heating for the vulcanization. In examples 3 and 4, gelling of the foam takes place at room temperature (22° C.).

| Properties of the foam latex (bulk density = 100 g/l) | | | | |
|---|---|---|---|---|
| | SBR-Latex | | Natural Latex | |
| Example | 1 | 2 | 3 | 4 |
| Accelerator type | DEZC | DBCA Zn | DEZC | DBCA Zn |
| Amount (TL/100 TS) | 1 | 3 | 1 | 3 |
| Vulcanization rate (min.) | 9.5 | 9.5 | 9.0 | 8.5 |
| Huels-method* Indentation hardness (N) DIN 53 756, B punch | 135 | 135 | 95 | 115 |
| Tensile strength (MPa) DIN 53 571-A | 0.08 | 0.08 | 0.120 | 0.130 |
| Elongation at break (%) DIN 53-504 | 150 | 190 | 315 | 320 |
| Pressure-compression set (%) DIN 53 572, 22h/70° C. | 13.2 | 12.7 | 5.7 | 4.6 |

SBR-latex: BUNATEX SL 3510
Natural latex: Centrifuge latex KAGETEX LA TC, Kautschukgesellschaft mbh, Frankfurt
DEZC: Diethylzinc dithiocarbamate
DBCA Zn: Zinc salt of 3,5-di-t-butyl-4-hydroxybenzene dithiocarboxylic acid
TL/100 TS: Parts by weight per 100 parts by weight of dry latex substance
*Test device according to DBP 28 35 038, temperature = 100° C.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for vulcanizing an aqueous dispersion of unsaturated polymers at temperatures less than or equal to 100° C., wherein the vulcanizing system comprises sulfur and an aromatic hydroxydithiocarboxylic acid or its salt of the general formula B—A used in an amount of 0.1-5.0 phr, in which B is

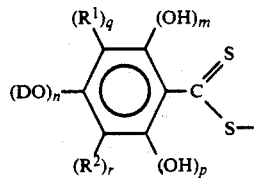

n, m, p, q and r are 0 or 1, where the sum of $n+m+p$ is at least 1, $R^1$ and $R^2$ are the same or different radicals which are
alkyl radicals with 1 to 10 C atoms
alkylene radicals with 1 to 10 C atoms, or
aralkyl radicals with 7 to 15 C atoms, D is hydrogen, and A represents B, ammonium ion, univalent metal ion or divalent metal ion.

2. A process as in claim 1, wherein the water solubility of the aromatic hydroxydithiocarboxylic acid or its salt is less than 1%.

3. A process as in claim 1, wherein the water solubility of the aromatic hydroxydithiocarboxylic acid or its salt is less than 0.1%.

4. A process as in claim 1, wherein the zinc salt of 3,5-di-t-butyl-4-hydroxybenzene-dithiocarboxylic acid is used with sulfur as the vulcanizing system.

5. A process as in claim 1, wherein said aqueous dispersion of unsaturated polymers is butadiene styrene copolymers polybutadiene, polyisoprene, or acrylonitrile butadiene copolymers.

6. A process as in claim 1, wherein the aqueous dispersion of unsaturated polymers additionally contains accelerators, activators, anti-ozone agents, antiaging (oxidation) agents, gelling agents, thickening agents or a combination thereof.

7. A process as in claim 1, wherein $R^1$ and $R^2$ each represent t-butyl and A is Zn.

* * * * *